Figure 1:
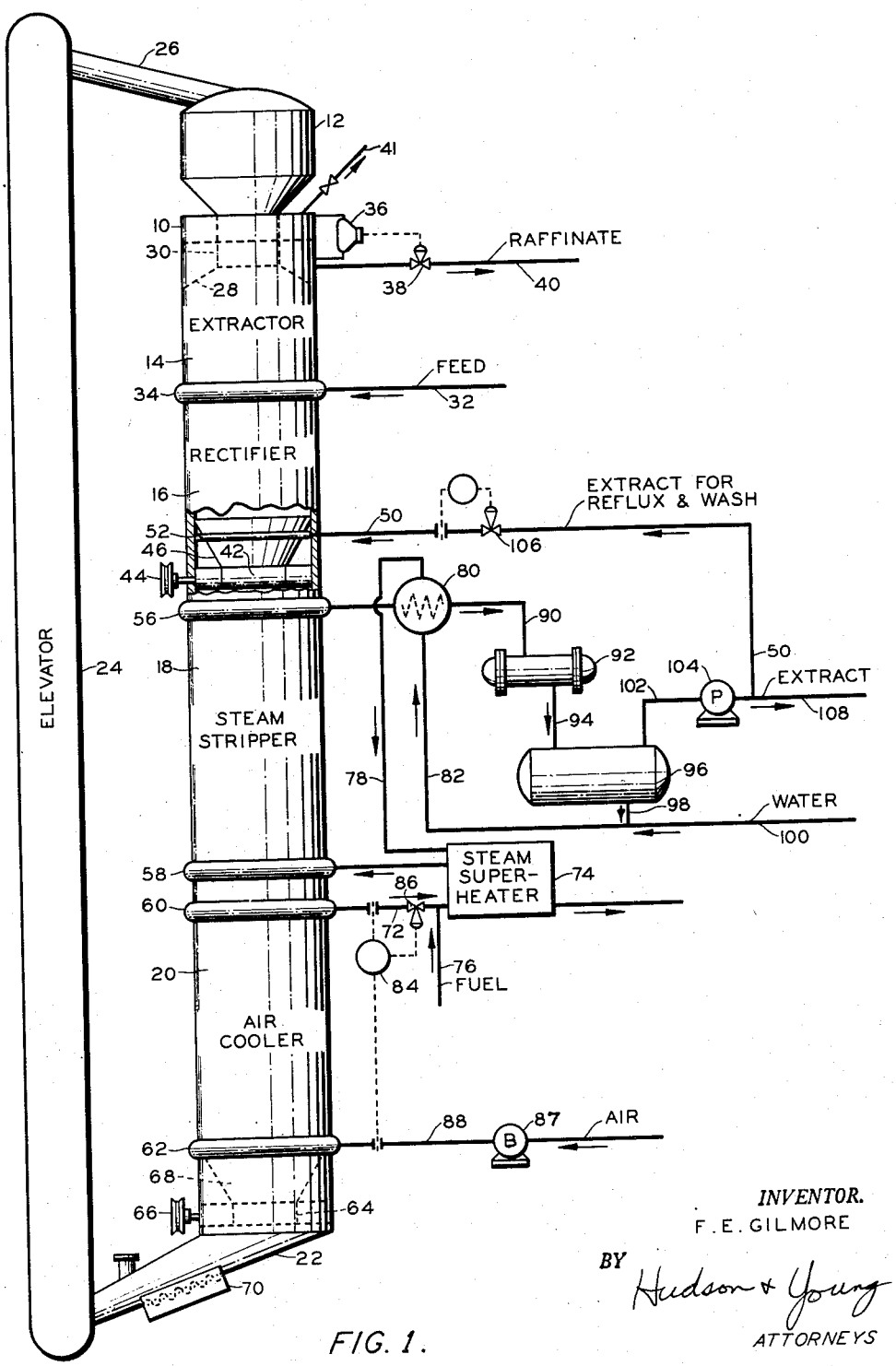

Dec. 7, 1954     F. E. GILMORE     2,696,304
PROCESS FOR CONTINUOUS ADSORPTION

Filed Oct. 24, 1949     2 Sheets-Sheet 1

INVENTOR.
F. E. GILMORE
BY Hudson & Young
ATTORNEYS

United States Patent Office 2,696,304
Patented Dec. 7, 1954

2,696,304

PROCESS FOR CONTINUOUS ADSORPTION

Forrest E. Gilmore, Bartlesville, Okla., assignor to Phillips Petroleum Company, a corporation of Delaware Application October 24, 1949, Serial No. 123,201

7 Claims. (Cl. 210—42.5)

This invention relates to a continuous method and apparatus for separating organic mixtures into constituents by selective adsorption. In one of its specific aspects, the invention pertains to improvements in such adsorption process and apparatus wherein a downwardly moving bed of adsorbent is employed. In one of the preferred embodiments, a method is used which is particularly adapted to minimize packing of the moving solid adsorbent normally encountered when the adsorbent is passed through one or more restrictions in the apparatus.

It has long been known to contact a liquid mixture of organic materials with solid adsorbents, usually silica gel or activated charcoal, although many other adsorbents such as activated alumina, bauxite, magnesia, etc. may be used, whereby the more readily adsorbed component or components are taken up by the solid and the less readily adsorbed component or components remain unadsorbed. In this manner a separation may be obtained between components of a two component mixture, or a complex mixture may be separated into two fractions of different characteristics according to adsorbability. By repeated treatment, three or more fractions of different character may be separated. Several methods of recovering the adsorbed material from the solid are available, including the use of a different liquid for which the solid adsorbent has more affinity than the organic material which it has adsorbed, the use of a different liquid for which the solid adsorbent has less affinity than the organic material which it has adsorbed, and removal of the adsorbed material by vaporization from the adsorbent. Thus, a hydrocarbon mixture containing paraffins and aromatics may be contacted in the liquid phase with silica gel under conditions at which the paraffins are unadsorbed and the aromatic material is adsorbed. The paraffinic material is physically separated as one product from the gel, and the latter is then treated by one of the methods mentioned to remove the aromatic material which is thus recovered as the other product.

Lately, this basic process which has long been used by batch procedures has been developed into a continuous process, in which the silica gel or other solid adsorbent, in the form of powder or small granules, is passed downwardly in the form of a compact bed or columnar mass in contact with the hydrocarbon or other liquid material which is being treated. The liquid feed is introduced at an intermediate or low point in the column of gel, and the unadsorbed so-called raffinate is withdrawn from the top. The adsorbed material or so-called extract is separated from the gel by a number of methods, either in the same column or in a separate column. The potential advantages of such a continuous process are obvious. However, many difficulties are encountered in attempting to convert the batch or semi-batch procedure formerly used to a truly continuous procedure. Thus, satisfactory movement of the wetted gel through a column, valves, conveyors, elevators, etc. is not readily attained. Packing of the gel against the walls of the apparatus and sometimes agglomeration of the gel into lumps becomes a serious problem when the cross-section of the gel column is restricted during downward flow. Sufficient and adequate contact between gel and the liquid being treated is sometimes difficult to accomplish. Clean cut separations avoiding contamination of either raffinate or extract with each other or with liquid desorbents are required but not always obtained. Particularly when a liquid desorbent, which may or may not be immiscible with the liquid being treated, also has a lower specific gravity, it is difficult to avoid mixing of liquids.

It is therefore an object of this invention to provide a continuous adsorption process for the fractionation of liquid organic compounds.

It is another object of this invention to provide a continuous adsorption process for the fractionation of liquid petroleum stocks.

It is a further object of this invention to provide a continuous adsorption process in which the selectively adsorbed material or extract may be recovered in good yields.

It is still another object of this invention to provide a continuous adsorption process in which a downwardly moving column or bed of adsorbent particles is positively moved from one zone to another while avoiding undesired packing of the particles, agglomeration into lumps, and sticking to parts of the apparatus.

A further object of the invention is to avoid contamination of unadsorbed raffinate liquid and contamination of solid adsorbent while it is effecting a desired adsorption, with a liquid desorbent having lower specific gravity than the liquid material treated.

Another object is to provide improved apparatus capable of effecting the desired movement of a solid particulate adsorbent relative to various fluid streams.

Further objects and advantages of the invention will be apparent to one skilled in the art from the accompanying disclosure and discussion.

Figure 2:
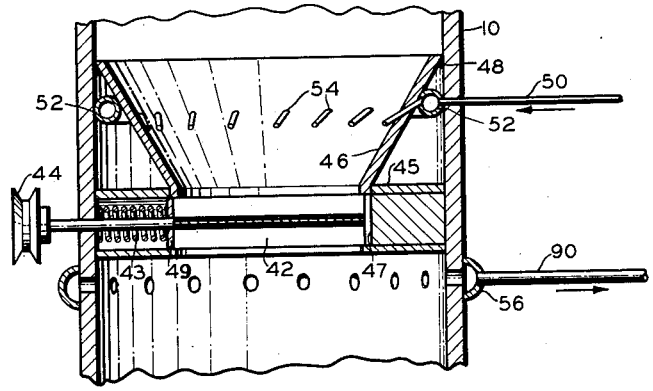
Figure 3:
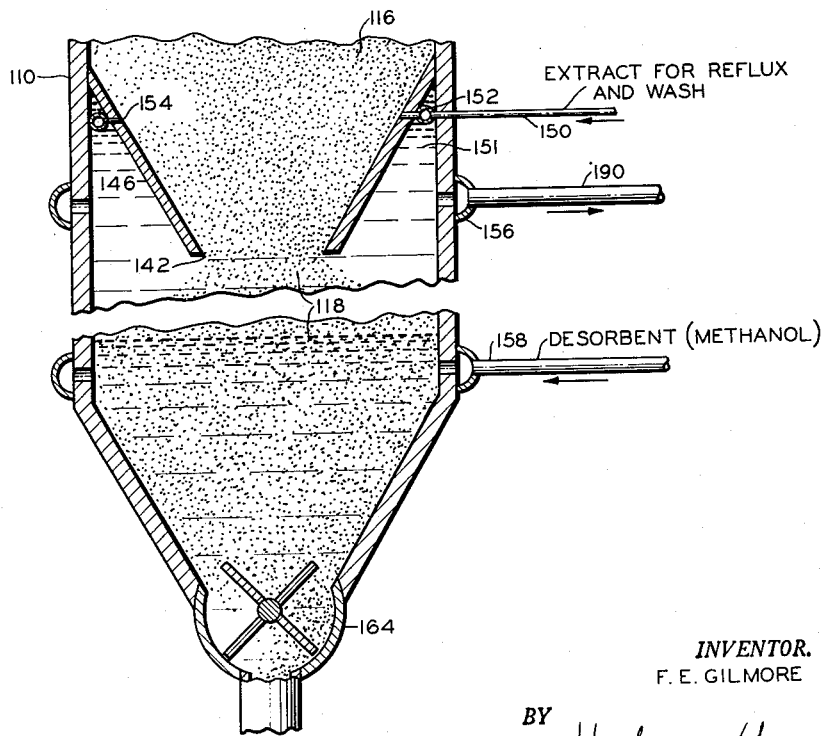

Two preferred embodiments of my improved process and apparatus are illustrated in the accompanying diagrammatic drawings. Figure 1 is an elevation view of an adsorption-desorption column and associated equipment. Figure 2 is a detailed vertical cross-section view of the portion of the column of Figure 1 which joins the rectifying and steam stripping sections thereof, showing in more detail the structure of this embodiment of my invention. Figure 3 is a vertical cross-section of a portion of a column used in another embodiment of my invention employing a light liquid desorbent. It is to be understood that various auxiliary items of equipment, and the detailed construction of parts of the equipment shown, have been omitted from the drawings for the sake of simplicity, as same can be readily supplied by one skilled in the art having been given the present disclosure. The various principles of the invention and some of the specific modifications coming within the scope of the invention will be explained in conjunction with the drawings.

In Figure 1, a vertical tower 10 is shown composed of the following sections beginning at the top: hopper 12, extractor 14, rectifier 16, steam stripper 18, air cooler 20 and bottom 22. The diameter of the column, and the height of the various sections, are selected in accordance with the size of plant required and the type of adsorption operation to be carried out.

A suitable solid adsorbent, such as silica gel of a size ranging from 30 to 60 mesh on down to 200 mesh (which latter is fine powder), is introduced into the hopper 12 from the top of elevator 24 through line 26, ordinarily in a heated condition from the desorption and drying operations hereinafter described. The silica gel feeds from the hopper 12 into the extractor 14 as the level of the top 28 of the bed of silica gel therein drops below the open bottom of the hopper, the hopper skirt 30 extending into the top of extractor 14 a distance of two or three feet in a commercial sized plant. Liquid feed to be treated, for example cracked gas oil, or a lighter narrow-boiling hydrocarbon fraction containing paraffins and aromatics with or without other types of hydrocarbon components and which cannot readily be separated by fractional distillation, is fed from line 32 into a distributor donut ring 34, at the bottom of the extractor section 14. This donut ring 34 encircles the column 10, and contains a number of openings thereinto. The openings from this donut ring 34 into the extractor 14 are such that the velocity of the feed liquid will carry it about ⅓ the distance into the center of the extractor. This results in an even distribution of the feed within the downwardly moving column or bed of silica gel without any internal equipment which would prevent the downward flow of silica gel as a bed. The aromatic components of the feed are selectively adsorbed by the silica gel and carried downward therewith, while the paraffinic components are not adsorbed and flow upwardly through column 10. The portion of the column comprising sections 14 and 16 is maintained essentially liquid full by liquid level controller 36 controlling valve 38 in raffinate withdrawal line 40 through which the product raffinate oil, i. e. the non-adsorbed paraffinic constituents of the feed, is withdrawn. Line 41 is a vent to the air or blowdown system, for use if required.

The rectifier section 16 is ordinarily shorter than extractor 14, is continuous therewith, and is normally almost full of recovered extract oil (of high purity in the bottom and gradually approaching the composition of the feed at the top of section 16). At the base of the rectifier 16 is a mechanically driven star valve 42, driven by any suitable source of power by means of driving wheel 44. Valve 42 is operated to cause the downward flow of the adsorbent at a predetermined rate of circulation. The gel approaches the valve 42 through a frusto-conical funnel element 46, and thus the columnar mass or bed of gel as it moves downwardly is gradually subjected to restriction of its cross section. The funnel or throat 46 preferably has only surfaces which contain no abrupt changes of direction, and takes the approximate shape of an inverted frustum of a cone, with the periphery of the inverted base of the cone being welded or otherwise attached to the inner wall of column 10 around a circular section thereof as at 48. I will refer herein to throat 46 as being of a frusto-conical shape, it being understood that the term is used in a broad sense permitting variations from the strict cone shape, and allowing the lower opening formed by a plane cutting across the hypothetical cone at the star valve 42 to be other than circular, preferably rectangular. In the form shown in the drawing, star valve 42 is essentially cylindrical, with the horizontal axis considerably longer than its diameter.

In order to minimize packing of the gel and its adherence to the surfaces of throat 46, and to insure the flow of said silica gel through star valve 42, a reflux stream of extract oil recovered as hereinafter described is introduced from line 50 through ring 52. In turn, numerous outlet nozzles 54 pass from ring 52 into throat 46, and the extract oil is passed therethrough in such a manner as to agitate the silica gel and keep it from sticking to the sides of throat 46 as it approaches and enters star valve 42. Each of the nozzles 54 are preferably directed downwardly and laterally within throat 46 so as to cause a swirling and washing action of the liquid reflux along the inner surface of throat 46. This stream of extract oil is introduced into the throat 46 at such a rate that it serves as a flush to aid in carrying the gel downwardly through the throat, thus minimizing bridging and packing of the gel in the throat and allowing its ready flow from the bottom thereof through valve 42 into the steam stripper zone 18 therebelow. The extract passed into the throat as described also serves as reflux to the system, and by upward flow in the throat 46 and rectifier section 16 displaces from the gel by desorption any residual raffinate material and washes upwardly and away from the downflowing gel any mechanically occluded raffinate material. Of course, any such extract passing upwardly ultimately becomes adsorbed by the gel and is brought back down into the stripper section 18 for recovery as will be described. The material passed through star valve 42 is composed of the silica gel and the constituents adsorbed thereon as well as some net flow of recycled liquid extract which serves as a washing medium as described.

The star valve 42 discharges into the top of the steam stripper section 18 in such a manner that the top of the adsorbent bed in the steam stripper is highest in the center, leaving an annular space vacant of silica gel in the top of this section next to the outside shell of column 10 and affording a steam and vapor separating and outlet space which is encircled by donut ring 56 for withdrawal of gases. Super-heated steam is introduced at the base of steam stripper section 18 through donut distributor ring 58 in sufficient amount and at a high enough temperature (but below a temperature causing cracking of any extract material) to displace most or all of the extract oil adsorbed in and on the silica gel. By way of example this steam stripper section 18 may be about 10 feet high in a commercial plant, and steam will be adsorbed in the non-gaseous state on the silica gel at the top of the section 18 sufficient to displace the adsorbed oil but most of this adsorbed water will be removed by heat by the time the silica gel reaches the bottom of stripper section 18.

At the bottom of the steam stripper section 18, an inverted conical baffle (not shown for the sake of simplicity) may be used to deflect the silica gel bed inwardly to leave a space a few inches wide around its bottom between it and the shell as an air outlet space for the air cooler section. This space is encircled by a donut ring 60 for withdrawal of air from the column. The air cooler section 20 may be about 5 feet long in the example under discussion. Air, previously dehydrated if necessary, is forced into the bottom of section 20 through distributor ring 62 for the purpose of partly cooling and completely dehydrating the silica gel. Below this air inlet 62 is another star valve 64 with its driving wheel 66 similar to the valve 42 hereinabove described. Valve 64 is approached by conical throat 68, but the problem of packing and sticking encountered in the throat 46 is not present to an appreciable extent because the bed of silica gel is now dry and thus more even-flowing. Valve 64 allows the dehydrated silica gel to flow into the bottom section 22 of the apparatus, from whence it flows downward across a vibrating screen 70 for removal of fines and thence into the bottom of elevator 24 which returns it to the hopper 12. Elevator 24 may be of the bucket type or any other suitable form.

Hot air from the top of the air cooler section 20 is withdrawn through ring 60 and passed via line 72, into the super-heater 74 where it serves to burn fuel introduced thereinto via line 76. Feed for steam super-heater 74 is obtained from line 78, which carries steam and/or water from heat exchanger 80, the water having been introduced into heat exchanger or waste heat boiler 80 from line 82. In order to withdrawn from section 20 approximately the same amount of air (after allowing for temperature increase) as fed to section 20, a ratio controller 84 is provided to operate a suitable motor valve 86 on outlet line 72. It is not objectionable to allow a limited amount of air to pass into the steam stripper 18, although it is preferred that the reverse be permitted so that a little steam flows out of section 18 into section 20 and out with the air through ring 60 and line 72. A blower 87 is employed for passing air via line 88 into distributor ring 62 as described.

Steam and stripped extract oil in the vapor form are withdrawn from the top of the steam stripper section 18 through ring 56 and passed via line 90 and waste heat boiler 80 to a condenser 92. The condensed liquids pass via line 94 into a settler or decanter 96, wherein they are separated by virtue of difference in specific gravity. In some cases where the extract is of almost the same gravity as water, a centrifuge can be used. Condensed water is withdrawn through 98 and passed together with make-up water from line 100 through line 82 to waste heat boiler 80 and thence via line 78 to steam super-heater 74 for reuse in the process. Extract oil is withdrawn from settler 96 via line 102 and pump 104, and a portion thereof returned via line 50 for use as reflux and flush liquid as hereinabove described. A rate of flow controller 106 is provided on line 50. The net make of extract oil is recovered as product through line 108.

As indicated above, the raffinate product is recovered from the top of column 10 through line 40. The raffinate oil in the top of column 10 is used to cool the dry silica gel introduced via hopper 12, and accordingly the bed of silica gel in extractor section 14 is two or three feet deeper than would otherwise be required in order to provide for this heat exchange action in the top of the extractor bed.

Figure 2 has been largely described above in conjunction with Figure 1. In addition to the elements already mentioned, Figure 2 shows a coiled compressed spring 43. This acts to urge the rotor of the star valve 42 inwardly. The rotor and the opening into which it fits are slightly tapered, being smaller at the end opposite the drive gear 44. As the valve wears, the spring 43 moves same inwardly to provide a close fit. The vanes comprising the rotor of valve 42 fit within a cylinder 45, which is blocked at both ends as at 47 and 49.

Figure 3 illustrates another embodiment of my invention, wherein instead of extract recovery by vapor stripping, a liquid desorbent is employed. It is known to employ as liquid desorbent either a liquid more readily adsorbed by the silica gel or other adsorbent than is the extract material, or a liquid less readily adsorbed. The latter is possible in view of the fact that adsorption-desorption is an equilibrium operation and an adsorbed liquid, such as an aromatic hydrocarbon, can be desorbed into a paraffinic or cycloparaffinic hydrocarbon liquid which is sufficiently low in its content of aromatic hydrocarbon. In the embodiment of Figure 3, methanol is employed as a desorbent for aromatic hydrocarbons. The methanol is selectively adsorbed with resulting desorption of aromatics. However, methanol has a lower specific gravity than aromatic hydrocarbons. Hence there is a serious danger than methanol might work its way up through the column of silica gel and at least some of same reach the top and contaminate the raffinate. Even if this does not happen its adsorption at a point in the column above the desorption zone, where adsorption of aromatics is desired to take place, lowers the capacity of the silica gel column.

In Figure 3, a vertical cylindrical column 110 is partly shown. It will be understood that the upper portion can be similar to the portion of column 10 of Figure 1 which includes feed inlet distributor ring 34 and the extractor section 14 as well as the equipment thereabove. The portion of column 110 shown in Figure 3 comprises a rectifier section 116 and a desorption section 118. Interposed between these two sections and connecting same is an inverted frusto-conical throat 146. The downwardly moving columnar mass of silica gel is allowed to move as a single undispersed bed from zone 116 down through throat 146, the mouth 142 of throat 146, and on into and through desorption zone 118. Liquid methanol desorbent is introduced into the bottom of zone 118 through line 158. Silica gel, having been freed from extract, is removed from the bottom of column 110 through star valve 164 or other suitable means. The thus-removed gel must then be freed of methanol by means not shown, such as by heating to vaporize the methanol, before being returned to the top of the column for reuse. The liquid methanol introduced through line 158 flows upwardly through zone 118 and effects desorption of extract oil from the downwardly flowing bed of silica gel. The extract in solution and excess methanol is withdrawn from annular space 151 by means of donut ring 156 and line 190. This material is passed to a fractional distillation column not shown wherein the methanol desorbent and extract oil are separated one from the other. The methanol is returned via line 158, while the extract oil is partly recovered as a product and the rest is returned to the system through line 150 and distributor ring 152. The latter is equipped with several openings through throat 146, preferably with such means as nozzles 154. The extract oil is thus introduced into the throat 146 at such a rate that its serves as a flush to aid in carrying the gel downwardly through the mouth 142 of throat 146 and on into desorption zone 118, thus minimizing bridging and packing of the gel in the throat and avoiding sticking of the gel to the surface of throat 146. The net down-flow of extract oil through throat 146 and its mouth 142 also prevents any upward flow of methanol into the throat portion of rectifier section 116. It is preferred that the mouth 142 of throat 146 have a diameter of not greater than ¼ that of the diameter of column 110, thus avoiding the necessity of an exceptionally large flow of extract oil therethrough. The extract recycled into the throat from line 150 also serves as reflux for the system, as described hereinabove with reference to Figure 1.

In view of the fact that the basic physical principles underlying adsorption are now well known to the art, a detailed consideration of same will not be given here. Those skilled in the art will readily understand that the exact conditions to be employed, including temperatures and relative flow rates of adsorbent, feed and reflux, will be greatly dependent on the particular feed stream which it is desired to separate, the degree of separation chosen, and the characteristics of the particular adsorbent used. Similarly, the residence time and temperature required for satisfactory desorption are dependent on the adsorbent, the character of the extract, and the character of the desorption operation.

The process described may be applied to a wide variety of feed stocks. In addition to the types mentioned specifically hereinabove, wide boiling range gasolines may be treated to effect separation of hydrocarbons merely by type rather than by individual chemical components, virgin or cracked gas oils may be treated to separate same into a highly aromatic extract suitable for feed in making furnace type carbon black such as "Philblack" and a highly paraffinic raffinate, suitable for catalytic cracking, kerosene or other naphtha fractions may be treated to remove aromatics and sulfur compounds therefrom. Narrow boiling aromatic-paraffinic or olefinic-paraffinic cuts may be fractionated by adsorption to produce pure aromatic, paraffinic and olefinic compounds. It will be noted that this adsorption fractionation process is adapted to any desired degree of separation. Thus it may be used to produce a relatively pure compound or it may be used merely to further concentrate the desired compound in its original mixture.

Numerous non-hydrocarbons and particularly non-hydrocarbon organic liquid mixtures may be subjected to adsorption to separate same into group or individual constituents. The separation or fractionation of normally solid or gaseous organic compounds as well as the employment of normally solid or gaseous organic compounds as desorbing agents, especially those readily liquefied, are within the scope of this invention since they may be changed to liquids by appropriate coordination of two normal process variables, namely, temperature and pressure. For example, this process is readily adaptable to the fractionation of a normally gaseous butene-butadiene liquid mixture by slightly increasing operating pressures. In this and other cases gases other than steam may be used for desorption. Similarly it is within the scope of this process to purify a normally solid naphthalene stock by conducting the liquid adsorption-fractionation at a moderately elevated temperature. With respect to hydrocarbon types in general, polynuclear aromatics are most readily adsorbed, mono-nuclear aromatics next, and continuing in accordance with decreasing adsorbability are the cyclic olefins, open-chain olefins, naphthenes, and paraffins. Ketones are more readily adsorbed than hydrocarbons, alcohols more than ketones, and water more than alcohols. The relative adsorbability of other liquids are already known to the art, or may be readily determined by trial. While methanol has been described herein as the desorption liquid, and steam as the desorption gas, various other liquids or gases capable of effecting this are known to the art and may be used as determined by convenience or economics, taking into consideration effectiveness for desorbing a particular extract, cost, effect on adsorbent, and ease of removal from adsorbent.

While specific and preferred embodiments of the invention have been described herein, it will be appreciated that other variations may be made in the apparatus and process without departing from the spirit and scope of the invention.

I claim:

1. A process for continuously separating organic compounds capable of being selectively adsorbed by contact in the liquid phase with a solid adsorbent which comprises continuously moving particles of a suitable solid adsorbent agglomerated into a columnar mass or bed downwardly through an adsorption zone in a treating vessel, continuously feeding said organic compounds in the liquid phase at an intermediate point into the adsorption zone into contact with the moving mass of adsorbent, continuously withdrawing a liquid non-adsorbed fraction from the upper portion of the adsorption zone as a product, passing said mass of adsorbent through a frusto-conical funnel element as it passes downwardly below the point of feed inlet, passing adsorbent from the bottom of said funnel element to a desorption zone and therein effecting desorption of the selectively adsorbed fraction of organic compounds, withdrawing a desorbed fraction containing desorbent material and product from an open region defined by the walls of the treating vessel, said funnel element, and the portion of said mass of adsorbent immediately below said funnel element, recovering a portion of said desorbed fraction as a product, recovering another portion of said desorbed fraction and introducing same into the columnar mass of restricted cross section in said funnel element at a rate sufficient to provide reflux liquid to the adsorption zone and flushing liquid through the restricted cross section mass minimizing packing and sticking of adsorbent particles in said mass of restricted cross section.

2. A process according to claim 1, wherein said another portion of described fraction is introduced at a plurality of points on the periphery of said mass of restricted cross section.

3. A process according to claim 2, wherein the said another portion of desorbed fraction is introduced at a rected jets effecting a swirling motion of liquid reflux around the outer surface of said mass of restricted cross section.

4. A process according to claim 1, wherein said mass is caused to move downward below the point of feed inlet in a compacted mass having a shape approximating that of an inverted frustum of a cone.

5. A process according to claim 1, wherein said adsorbent is removed from the bottom of said mass of restricted cross section by positive mechanical motion thereof in successive portions through an essentially liquid-tight sealing and transfer zone and discharged into an adjacent desorption zone therebelow, said flushing liquid serving to wash particles of adsorbent in said mass of restricted cross section downwardly into said sealing and transfer zone.

6. A process according to claim 1, including allowing said columnar mass of adsorbent, after having been subjected to said gradual restriction of cross section, to continue downward into a desorption zone as an uninterrupted column and enlarge in cross section therein to its original size, and introducing a liquid desorbent into said desorption zone and maintaining said zone full of liquid.

7. A process according to claim 6, wherein said liquid desorbent has a lower specific gravity than said desorbed fraction, and sufficient of said desorbed fraction as flushing liquid is passed down through said mass of restricted cross section and into said desorption zone to avoid upward passage of liquid desorbent into said mass above the level of minimum cross section of said uninterrrupted column of adsorbent.

References Cited in the file of this patent

UNITED STATES PATENTS

| Number | Name | Date |
|---|---|---|
| 1,595,603 | Heffner et al. | Aug. 10, 1926 |
| 1,776,761 | Morterud | Sept. 23, 1930 |
| 2,263,688 | Allen et al. | Nov. 25, 1941 |
| 2,327,175 | Conn | Aug. 17, 1943 |
| 2,448,489 | Hirschler | Aug. 31, 1948 |
| 2,449,402 | Lipkin et al. | Sept. 14, 1948 |
| 2,470,339 | Claussen et al. | May 17, 1949 |
| 2,542,521 | Hibshman et al. | Feb. 20, 1951 |
| 2,552,435 | Knox et al. | May 8, 1951 |
| 2,571,936 | Patterson et al. | Oct. 16, 1951 |
| 2,614,133 | Ockert | Oct. 14, 1952 |

FOREIGN PATENTS

| Number | Country | Date |
|---|---|---|
| 356,534 | Great Britain | Sept. 10, 1931 |
| | (Corresponds to following patent.) | |
| 703,784 | France | Feb. 10, 1931 |